(12) United States Patent
Cho et al.

(10) Patent No.: US 10,638,572 B2
(45) Date of Patent: *Apr. 28, 2020

(54) SWITCH CONTROLLED POWER BASED LIGHTING CONTROL

(71) Applicant: Eaton Intelligent Power Limited, Dublin (IE)

(72) Inventors: Nam Chin Cho, Peachtree City, GA (US); Brad Edward Paine, Fayetteville, GA (US); Parth Joshi, Sugar Hill, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,947

(22) Filed: Apr. 25, 2019

(65) Prior Publication Data

US 2019/0261496 A1    Aug. 22, 2019

Related U.S. Application Data

(63) Continuation of application No. 16/002,835, filed on Jun. 7, 2018, now Pat. No. 10,278,270.

(60) Provisional application No. 62/516,884, filed on Jun. 8, 2017.

(51) Int. Cl.
*H05B 37/02* (2006.01)
*H05B 33/08* (2020.01)

(52) U.S. Cl.
CPC ..... *H05B 37/0272* (2013.01); *H05B 37/0209* (2013.01); *H05B 37/0218* (2013.01); *H05B 37/0227* (2013.01); *H05B 37/0281* (2013.01)

(58) Field of Classification Search
CPC .................................... H05B 37/02; H05B 37/0218; H05B 37/0227; H05B 37/0272; H05B 37/0281; H05B 33/08; H05B 33/0815; H05B 33/0845; H05B 33/0857

See application file for complete search history.

(56) References Cited

U.S. PATENT DOCUMENTS

| | | | |
|---|---|---|---|
| 2009/0322255 A1* | 12/2009 | Lin | H05B 33/0845 315/307 |
| 2012/0080944 A1* | 4/2012 | Recker | H02J 9/02 307/25 |
| 2013/0200814 A1* | 8/2013 | Chen | H05B 33/0863 315/210 |
| 2014/0001962 A1* | 1/2014 | Harris | H05B 33/0842 315/153 |
| 2014/0091723 A1* | 4/2014 | Kuo | H05B 33/0818 315/200 R |
| 2015/0155748 A1* | 6/2015 | Nord | H02K 1/145 310/156.02 |

* cited by examiner

*Primary Examiner* — Thai Pham
(74) *Attorney, Agent, or Firm* — King & Spalding LLP (57) ABSTRACT

A method of lighting control includes detecting, by a control device, whether an AC power is available, where the availability of the AC power is controlled by a switch. The method further includes providing, by a driver, a driver power to a light source if the driver power was not provided to the light source when the AC power was last available. The driver generates the driver power from the AC power.

20 Claims, 6 Drawing Sheets

SWITCH CONTROLLED POWER BASED LIGHTING CONTROL

CROSS REFERENCE TO RELATED APPLICATIONS

The present application is a continuation application of and claims priority to U.S. Nonprovisional patent application Ser. No. 16/002,835, filed Jun. 7, 2018 and titled "Switch Controlled Power Based Lighting Control," which claims priority under 35 U.S.C. Section 119(e) to U.S. Provisional Patent Application No. 62/516,884, filed Jun. 8, 2017, and titled "Switch Based Lighting Control." The entire contents of the preceding applications are incorporated herein by reference.

TECHNICAL FIELD

The present disclosure relates generally to lighting solutions, and more particularly to lighting control based on the availability of power controlled by a power switch.

BACKGROUND

Some lighting fixtures can be controlled wirelessly and can operate based on programmed schedules and/or based on inputs from sensors. In some cases, the Alternating Current (AC) power that is provided to such a lighting fixture is controlled by a switch, such as a wall-mounted toggle switch. For example, such a lighting power system may exist when the lighting fixture is a retrofitted lighting fixture. In such cases, a user may habitually or out of convenience toggle the switch off to turn off the light provided by the lighting fixture. When the lighting fixture is no longer receiving the AC power because the switch is toggled off, a user cannot wirelessly control operations of the lighting fixture, and the lighting fixture does not operate according to programmed schedules and sensor and other inputs. Thus, a solution that enables a lighting fixture to operate based on wirelessly transmitted commands as well as according to programmed schedules, other programming, and sensor and other inputs while allowing the user to control the light from the lighting fixture using a switch is desirable.

SUMMARY

The present disclosure relates generally to lighting solutions, and more particularly to lighting control based on a light switch. In an example embodiment, a method of lighting control includes detecting, by a control device, whether an AC power is available, where the availability of the AC power is controlled by a switch. The method further includes providing, by a driver, a driver power to a light source if the driver power was not provided to the light source when the AC power was last available. The driver generates the driver power from the AC power.

In another example embodiment, a lighting device includes a light source, a driver that generates a driver power from an AC power controlled by a switch, and a control device that controls whether the driver power is provided to the light source at least based on whether the driver power was provided to the light source when the AC power was last available to the driver.

In another example embodiment, a lighting system includes a light source, a power switch, and a driver that generates a driver power from an AC power controlled by the power switch. The system further includes a control device that controls whether the driver power is provided to the light source at least based on whether the driver power was provided to the light source when the AC power was last provided to the driver.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures may designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a switch (e.g., a wall toggle switch) may control whether an electrical power is provided to a lighting fixture that includes a light source (e.g., an LED light source) as well as other electrical components (e.g., an LED driver) that operate when electrical power is available. In some cases, a user may prefer for the light source to be off while other electrical components of the lighting fixture are powered on. For example, providing power to electrical components of a light fixture, such as a driver, while power is not provided to the light source may enable the lighting fixture to respond to user inputs (e.g., via a wireless transmission) and other inputs, such as sensor inputs, timer inputs, etc. when the light source is off. Providing power to other electrical components of a light fixture while power is not provided to the light source may also enable the lighting fixture to operate based on programmed schedules even when the light source is off. In some example embodiments, recalling the last state of the light source of the lighting fixture and inverting the last state upon a full toggle cycle of a switch that controls power to the lighting fixture may enable the lighting fixture to respond to inputs and operate based on programmed schedules regardless of whether the light source is powered on. Such a solution provides a user the option to use the switch to control the power state of the lighting fixture while allowing wireless control the lighting fixture.

Figure 1:
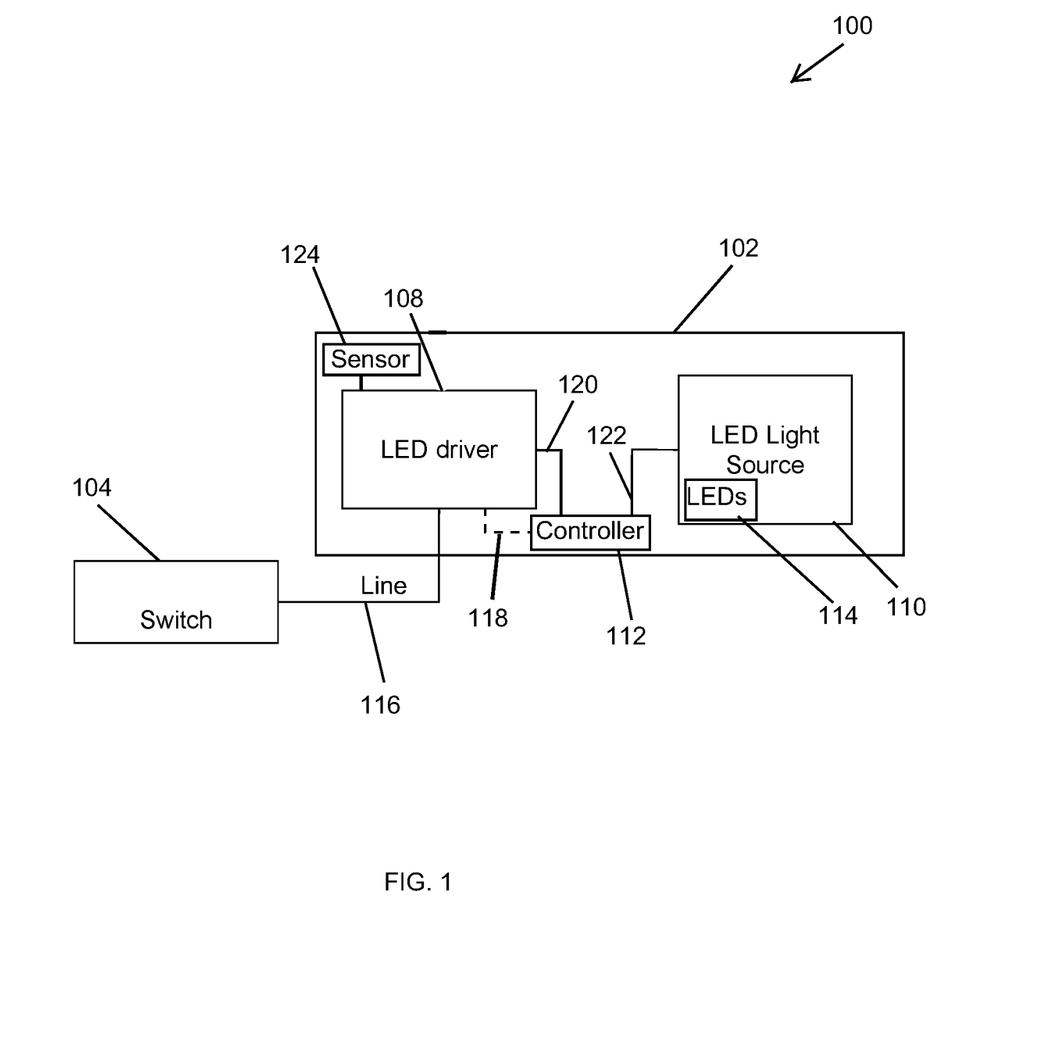
FIG. 1 illustrates a lighting system including a lighting device according to an example embodiment.

Turning now to the figures, example embodiments are described. FIG. 1 illustrates a lighting system 100 including a lighting device 102 according to an example embodiment. The system 100 includes a switch 104 that controls the availability of AC power (e.g., mains power) to the lighting device 102. For example, the switch 104 may be a wall-mounted switch. The AC power is provided to the lighting device 102 via a line connection 116 (e.g., one or more electrical wires) when the switch 104 is in an on-position (i.e., toggled/switched on), and the AC power is disconnected or otherwise unavailable to the lighting device 102 when the switch 104 is in an off-position (i.e., toggled/switched off).

In some example embodiments, the lighting device 102 includes an LED driver 108, a light source 110, and a control device 112. The light source 110 may include light emitting diodes (LEDs) 114. The LED driver 108 may receive AC power when the switch 104 is in the on-position and generate a driver power (e.g., a DC power) from the received AC power. The driver power from the LED driver 108 is provided to the control device 112 that controls whether the driver power from the driver 108 is provided to the light source 110. The light source 110 emits a light when the driver power from the driver 108 is provided to the light source 110. When the switch 104 is toggled to the on-position, the control device 112 controls whether the driver power from the driver 108 is provided to the light source 110 based on whether the driver power from the LED driver 108 was provided to the light source 110 when the switch 104 was previously in the on-position before being toggled to the off-position and back to the current on-position.

In some example embodiments, when the switch 104 is toggled to the on-position, resulting in the AC power being provided to the LED driver 108, the driver power generated by the driver 108 from the AC power may not be provided to the light source 110 if the driver power was provided to the light source 110 when the driver power was previously available. To illustrate, the driver power from the LED driver 108 may be provided to the light source 110 until the switch 104 is toggled to the off-position. When the switch 104 is toggled back to the on-position, the control device 112 may detect the toggle back to the on-position based on the driver power from the driver 108, which is unavailable when the switch 104 is in the off-position. Upon detecting the toggle back to the on-position, the control device 112 makes the driver power from the LED driver 108 unavailable to the light source 110.

Thus, although the AC power is provided to the LED driver 108 after the switch 104 is toggled back on, the light from the light source 110 is off because the driver power from the driver 108 is not provided to the light source 110. However, because the AC power is provided to the LED driver 108 when the switch 104 is in the on-position, the LED driver 108 may wirelessly or via wired connections receive lighting commands and other inputs, such as sensor inputs, and also may be operable based on programmed schedules although the light source 110 is not powered on. When the user subsequently toggles the switch 104 back to the off-position and back again to the on-position (for example, at a later time of the day), the control device 112 may make the driver power from the LED driver 108 available to the light source 110, which results in the light from the light source 110 being turned back on.

Table 1 below illustrates states of the switch 104 and corresponding example states of the light provided by the light source 110, where the states of the light correspond to whether driver power is provided to the light source 110.

TABLE 1

| Switch 104 | Light from Light Source 110 |
| --- | --- |
| On | On |
| Off | Off |
| On | Off |
| Off | Off |
| On | On |
| Off | Off |
| On | Off |

As illustrated in Table 1, the light from the light source 110 may be off even though the switch 104 is in the on-position, which indicates that the AC power is provided to the LED driver 108 but the driver power from the LED driver 108 is not provided to the light source 110. Because the AC power is provided to the LED driver 108 whenever the switch 104 is in the on-position, the LED driver 108 may wirelessly or via wired connections receive lighting commands as well as other inputs, such as sensor inputs. As illustrated in Table 1, the light from the light source 110 is turned back on after a subsequent toggle of the switch 104 to the off-position and back to the on-position.

In some example embodiments, the control device 112 may receive the driver power from the LED driver 108 via the connection 120 (e.g., one or more electrical wires) and provide the driver power to the light source 110 via a connection 122 (e.g., one or more electrical wires). The control device 112 may also receive other signals from the driver 108 via the connection 120 or another electrical connection.

In some example embodiments, when the driver power from the LED driver 108 is not provided to the light source 110 while the switch 104 is in the on-position, the LED driver 108 may indicate to the control device 112 that the driver power from the LED driver 108 should be provided to the light source 110. For example, the LED driver 108 may indicate to the control device 112 to provide the driver power to the light source 110 in response to a user input, a sensor input, and/or a timer input received by the LED driver 108 or based on a programmed schedule. The driver 108 may send one or more signals to the control device 112 via the connection 120 or via another electrical connection indicating that the driver power from the LED driver 108 should be provided to the light source 110.

To illustrate, the driver 108 may send such a signal to the control device 112 based on a programmed schedule (i.e., programmed in the driver 108) that may be based on different times of the day. The driver 108 may also send such a signal to the control device 112 in response to a lighting command (e.g., power-on command) that is wirelessly received, for example, by the driver 108. The driver 108 may also send such a signal to the control device 112 in response to another input such as an input from a sensor 124 that may be a motion or daylight sensor.

In some example embodiments, the control device 112 may make the driver power from the LED driver 108 available to the light source 110 in response to the signal from the LED driver 108, which results in the light source 110 emitting a light. After the driver power from the LED driver 108 is provided to the light source 110 based on the signal from the LED driver 108 to the control device 112, the control device 112 may continue to operate as described above with respect to subsequent toggles of the switch 104. For example, when the driver power from the LED driver 108 is provided to the light source 110 based on the signal from the LED driver 108 to the control device 112, subsequent toggles of the switch 104 to the off-position and back to the on-position result in the control device 112 making the driver power from the LED driver 108 unavailable to the light source 110. In some alternative embodiments, in cases where the driver power is made available to light source 110 because of a control signal from the LED driver 108 to the control device 112, the control device 112 may operate such that subsequent toggles of the switch 104 to off and back to on result in the control device 112 making the driver power available to the light source 110. Subsequent toggles of the switch 104 to the off-position and back to the on-position results in the control device 112 making the driver power from the LED driver 108 unavailable to the light source 110 although the AC power is provided to the driver 108.

By enabling the availability of power to some electrical components of the light device 102 while power is not provided to the light source 110, the lighting system 100 enables the lighting device 102 to operate in response to programmed schedules, user inputs, sensor and other inputs, etc. to power on the light source 110 when the light source 110 had been powered off using the switch 104.

In some example embodiments, the LED driver 108 may provide power to the control device 112 via a connection 118 (e.g., one or more electrical wires) instead of via the connection 120. That is, the LED driver 108 may power the control device 112 via the connection 118 and provide the driver power intended for the light source 110 via the connection 122. In some alternative embodiments, the lighting device 102 may include other components instead of or in addition to the components shown in FIG. 1. For example, one or more of the components of the lighting device 102 may be integrated into a single component. In some alternative embodiments, the control device 112 may rely on detecting multiple full toggles of the switch 104 (e.g., two or more back to back toggles from the on-position to the off-position and back to the on-position) to control whether the driver power from the driver 108 is provided to the light source 110.

Figure 2:
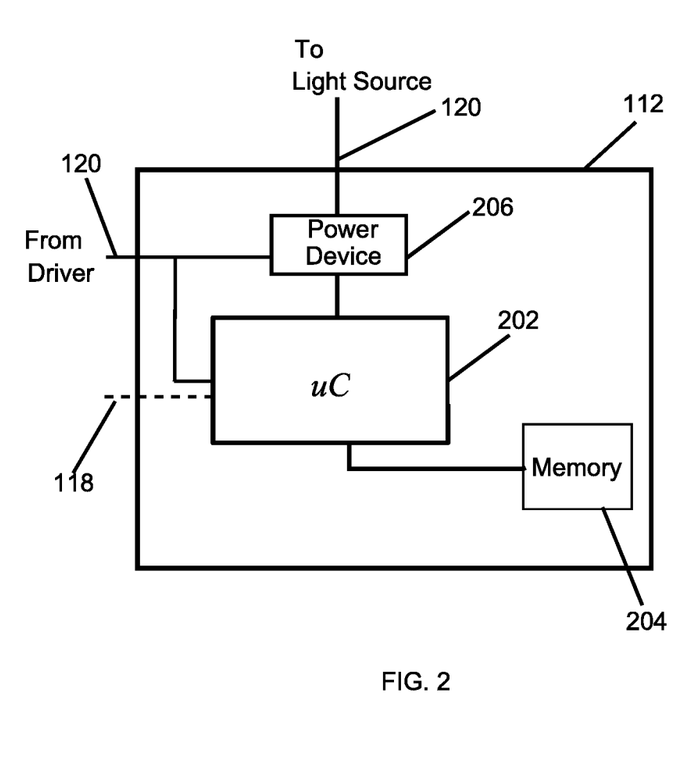
FIG. 2 illustrates the control device of FIG. 1 according to an example embodiment.

FIG. 2 illustrates the control device 112 of FIG. 1 according to an example embodiment. Referring to FIGS. 1 and 2, the control device 112 may include a controller 202 (e.g., a microcontroller), a non-volatile memory device 204 (e.g., an EEPROM or Flash memory), and a power device 206. For example, the controller 202 may execute software code stored in the memory device 204 to perform some of the operations described herein as can be readily understood by those of ordinary skill in the art with the benefit of this disclosure. The power device 206 may receive the driver power from the driver 108 and may provide the driver power to the light source 110 under the control of the controller 202. For example, the power device 206 may be a power transistor or another type of switch device that can be turned on and off by a switch control signal from the controller 202. To illustrate, the controller 202 may detect a toggle of the switch 104 from a power-off position to a power-on position based on the driver power (e.g., DC power) from the driver 108 and control the power device 206 accordingly. For example, the controller 202 may include an analog-to-digital converter that is coupled to an output of the LED driver 108, and the analog-to-digital converter may generate a digital output signal that can be processed by the controller 202 to determine when the switch 104 is toggled on (i.e., the AC power is provided to the LED driver 108). In some example embodiments, the Upon detecting that the switch 104 is toggled to the on-position, the controller 202 may control the power device 206 to control whether the driver power from the LED driver 108 is available or unavailable to the light source 110 depending on whether the driver power was provided to the light source 104 when the switch 104 was last in the on-position (i.e., when the AC power was last available). That is, upon detecting that the driver power is available from the LED driver 108 after being unavailable, the controller 202 may control the power device 206 to make the driver power from the LED driver 108 available or unavailable to the light source 110 depending on whether the driver power was provided to the light source 104 when the driver power was last available.

For example, upon detecting that the switch 104 is toggled to the on-position, the controller 202 may control the power device 206 to make the driver power from the driver 108 available to the light source 110 if the driver power was not provided to the light source 110 when the switch 104 was last in the power-on position (i.e., when the switch 104 was previously in the on-position before being toggled off then toggled back to on). As another example, upon detecting that the switch 104 is toggled to the on-position, the controller 202 may control the power device 206 to make the driver power from the driver 108 unavailable to the light source 110 if the driver power was provided to the light source 110 when the switch 104 was last in the power-on position.

In some example embodiments, the controller 202 may store information in the non-volatile memory device 204 that can later be used to determine whether the driver power from the driver 108 should be provided to the light source 110. To illustrate, the controller 202 may store information such as whether the driver power was provided to the light source 110 when the switch 104 was last in the on-position (i.e., when the driver power was last available from the LED driver 108). Upon subsequently detecting the toggling on of the switch 104, for example, based on the driver power from the LED driver 108, the controller 202 may retrieve the stored information from the memory device 110 and use the information to control the power device 206. For example, the controller 202 may control the power device 206 to make the driver power available to the light source 110 if the information retrieved from the memory device 204 indicates that the driver power from the LED driver was not provided to the light source 110 when the driver power was last available from the LED driver 108. If the information retrieved from the memory device 204 indicates that the driver power from the LED driver was provided to the light source 110 when the driver power was last available from the LED driver 108, the controller 202 may control the power device 206 to make the driver power unavailable to the light source 110.

In some example embodiments, the controller 202 may detect the toggling of the switch 104 to the on-position based on a separate signal provided to the controller 202, for example, via the connection 118. In some example embodiments, the control device 112 may detect the toggle of the switch based on another signal derived from the AC power signal outside of the LED driver 108. In some example embodiments, the control device 112 may include more or fewer components than shown without departing from the scope of this disclosure. For example, one or more of the components of the control device 112 may be integrated into a single component.

Figure 3:
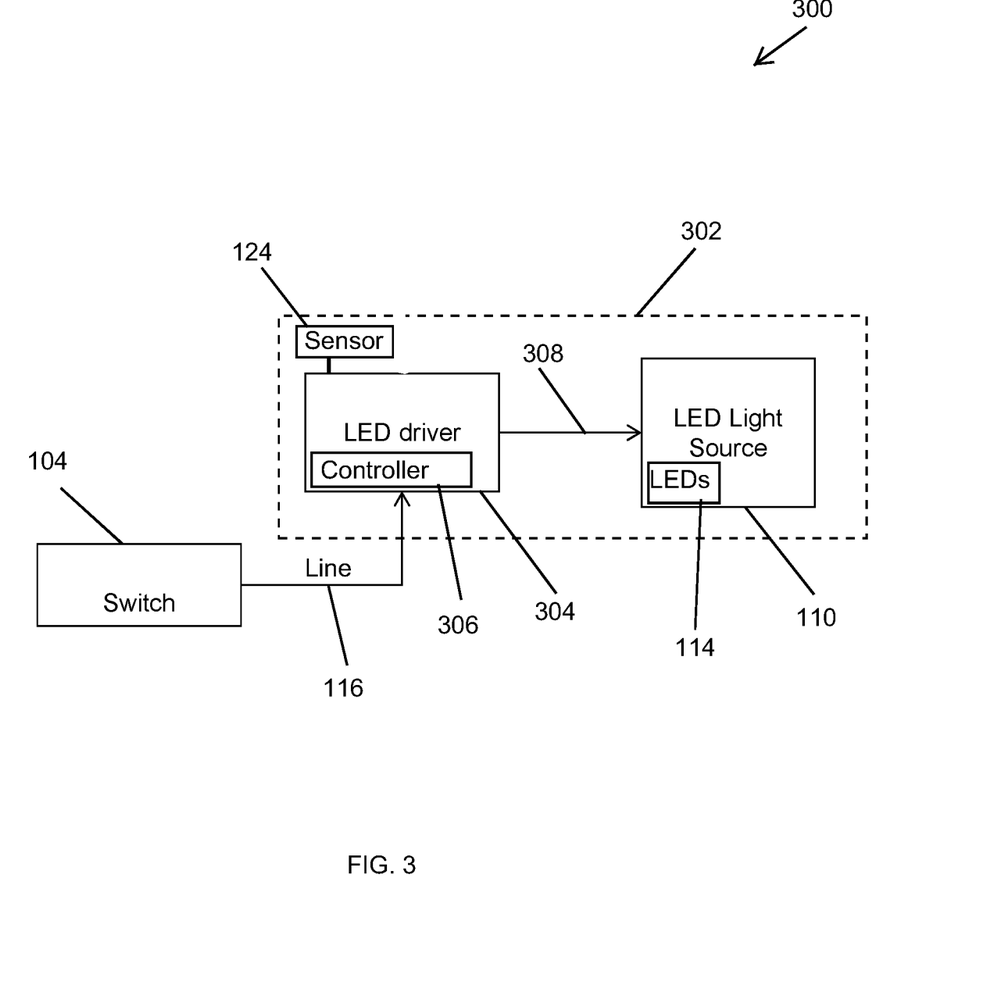
FIG. 3 illustrates a lighting system including a lighting device according to another example embodiment.

FIG. 3 illustrates a lighting system 300 including a lighting device 302 according to an example embodiment. The system 300 also includes the switch 104. The switch 104 may control the availability of AC power (e.g., mains power) to the lighting device 302 in a similar manner as described above with respect to FIG. 1. To illustrate, the AC power is provided to the lighting device 302 via the line connection 116 when the switch 104 is in an on-position, and the AC power is disconnected from the lighting device 302 when the switch 104 is in an off-position.

In some example embodiments, the lighting device 302 includes an LED driver 304, the light source 110, and the sensor 124. The LED driver 304 may include a controller 306 that controls whether the LED driver 304 provides the driver power to the light source 110 when the AC power is available. The light source 110 emits a light when the driver power from the driver 108 is provided to the light source 110.

In some example embodiments, the lighting device 302 operates in substantially the same manner as described above with respect to the lighting device 102. To illustrate, the control device 306 may correspond to the control device 112, and the LED driver 304 may correspond to the LED driver 108 where the control device 112 integrated therein. The LED driver 304 generates a driver power (e.g., DC power) from the AC power received via the connection 116 when the switch 104 is in the on-position and may generate and/or provide the driver power to the light source 110 over a connection 308 (e.g., one or more electrical wires).

In some example embodiments, the control device 306 may control whether the driver power is provided to the light source 110 in substantially the same manner as described above with respect to the control device 112. For example, the control device 306 may control the LED driver 304 to generate and/or provide the driver power to the light source 110 if the driver power was not provided to the light source 110 when the AC power was last available (i.e., when the switch 104 was last in the on-position). The control device 306 may also control the LED driver 304 such that the LED driver 304 does not generate and/or provide the driver power to the light source 110 when the AC power is available if the driver power was provided to the light source 110 when the AC power was last available (i.e., when the switch 104 was last in the on-position). The control device 306 may store information indicating whether the driver power is provided to the light source 110 when the AC power is available and subsequently retrieve the information when the AC power again becomes available (after becoming unavailable) to determine whether the LED driver 304 should generate and/or provide the driver power to the light source 110.

In some example embodiments, the control device 306 may control the availability of the driver power to the light source 110 based on the toggles of the switch 104 (i.e., availability of the AC power) and may also control other operations of the LED driver 304 such as responding to dimming inputs. For example, the control device 306 can control the amount of power provided to the light source 110, for example, based on a wirelessly received lighting command when the LED driver 304 is providing the driver power to the light source 110.

In some example embodiments, the lighting device 102 may include other components instead of or in addition to the components shown in FIG. 3. For example, some of the components of the lighting device 302 may be integrated into a single component. In some alternative embodiments, the control device 306 may rely on detecting multiple full toggles of the switch 104 (e.g., two or more back to back toggles from the on-position to the off-position and back to the on-position) to control whether the driver power from the driver 304 is provided to the light source 110.

Figure 4:
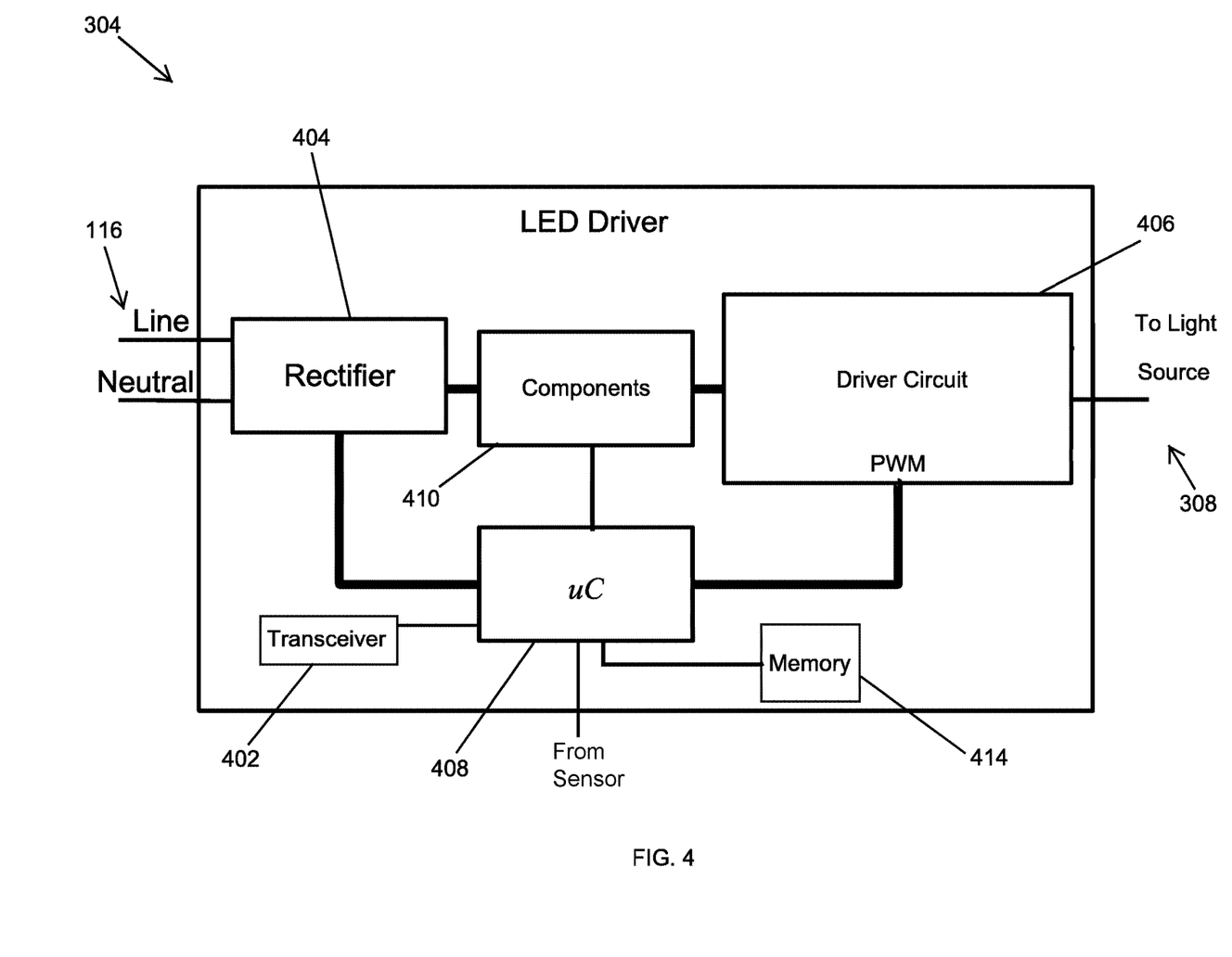
FIG. 4 illustrates the LED driver of FIG. 3 according to an example embodiment.

FIG. 4 illustrates the LED driver 304 of FIG. 3 according to an example embodiment. Referring to FIGS. 3 and 4, the LED driver 304 may include a wired or wireless transceiver 402 (or a receiver), a rectifier circuit 404, and an LED driver circuit 406. In some example embodiments, the control device 306 may include a controller 408 (e.g., a microcontroller) and a memory device 414 (e.g., an SRAM and/or an EEPROM). The LED driver 304 may also include other driver components 410 that support, for example, the generation of a driver output signal.

In some example embodiments, the controller 408 may detect when the AC power on the connection 116 becomes available at the LED driver 304. For example, the controller 408 may include an analog to digital converter that converts the output signal from the rectifier circuit 404 (or another signal derived from the output signal from the rectifier) to a digital signal that is processed by the controller 408 to determine when the AC power becomes available. Because the AC power is controlled by the switch 104, detecting the availability of the AC power based on the output of the rectifier 404 indicates whether the switch 104 is toggled on.

The controller 408 controls the driver circuit 406 to control whether the driver power is generated or provided to the light source 110 and the amount of power provided to the light source 110. For example, when the controller 408 detects the AC power becoming available (i.e., the switch 104 being toggled on from an off-position), the controller 408 controls the driver circuit 406 disable the generation of the driver power or to make the driver power is unavailable to the light source 110 if the driver power was provided to the light source 110 when the AC power was last available. Information on whether the driver power was provided to the light source when the AC power was previously available may have been previously stored in the memory device 414 by the controller 408. In general, when the AC power is available, the controller 408 may store information in the memory device 414 indicating whether the driver power from the driver circuit 406 is provided to the light source 110. When the AC power is available, the controller 408 may also retrieve stored information from the memory device 414 to determine whether the driver power from the driver circuit 406 should be generated and/or provided to the light source 110 based on whether the information indicates that the driver power was provided to the light source 110 when the AC power was last available (i.e., before the AC power became unavailable and then available as controlled by the switch 104).

In some example embodiments, after the controller 408 makes the driver power unavailable to the light source 110 based on the driver power being provided to the light source 110 when the AC power was last available, the controller 408 may make the driver power available to the light source 110, for example, in response to a user command received via the transceiver 402, a sensor signal from the sensor 124, a schedule programmed into the controller 408, a timer, etc. The controller 408 may store information in the memory device 414 indicating that the driver power is provided to the light source 110, and the stored information may be used when the AC power becomes subsequently available after being unavailable (i.e., when a user toggles the switch 104 to the off-position and back to the on-position). Alternatively, the controller 408 may determine whether the driver power should be provided to the light source 110 based on the toggles of the switch 104 as reflected by whether the AC power is available and may not rely on whether the driver power was provided to the light source 110 in response to user commands, sensor signal, etc.

In some example embodiments, after the controller 408 makes the driver power available to the light source 110 based on the driver power being unavailable to the light source 110 when the AC power was last available, the controller 408 may make the driver power unavailable to the light source 110, for example, in response to a user command received via the transceiver 402, a sensor signal from the sensor 124, a schedule programmed into the controller 408, a timer, etc. The controller 408 may store information in the memory device 414 indicating that the driver power is unavailable to the light source 110, and the stored information may be used when the AC power becomes subsequently available after being unavailable (i.e., when a user toggles the switch 104 to the off-position and back to the on-position). Alternatively, the controller 408 may determine whether the driver power should be provided to the light source 110 based on the toggles of the switch 104 as reflected by whether the AC power is available and may not rely on whether the driver power was provided to the light source 110 in response to user commands, sensor signal, etc.

By making power available to some components the lighting device 302 while the light source 110 is powered off, for example, using the switch 104, the controller 408 enables the lighting device 302 to operate in response to programmed schedules, user inputs, sensor and other inputs, etc. to power on the light source 110 to emit a light.

In some example embodiments, the LED driver 304 operates in a similar manner as the control device 112 and the LED driver 108. In some example embodiments, the LED driver 304 may include other components instead of or in addition to the components shown in FIG. 4 without departing from the scope of this disclosure. For example, some of the components of the LED driver 304 may be integrated into a single component. In some alternative embodiments, the controller 408 may control whether the driver power from the driver 304 is provided to the light source 110 based on multiple full toggles of the switch 104 (e.g., two or more back to back toggles from the on-position to the off-position and back to the on-position). In some example embodiments, the control device 306 show in FIG. 3 may include the controller 408 and one or more of the other components of the LED driver 304.

Figure 5:
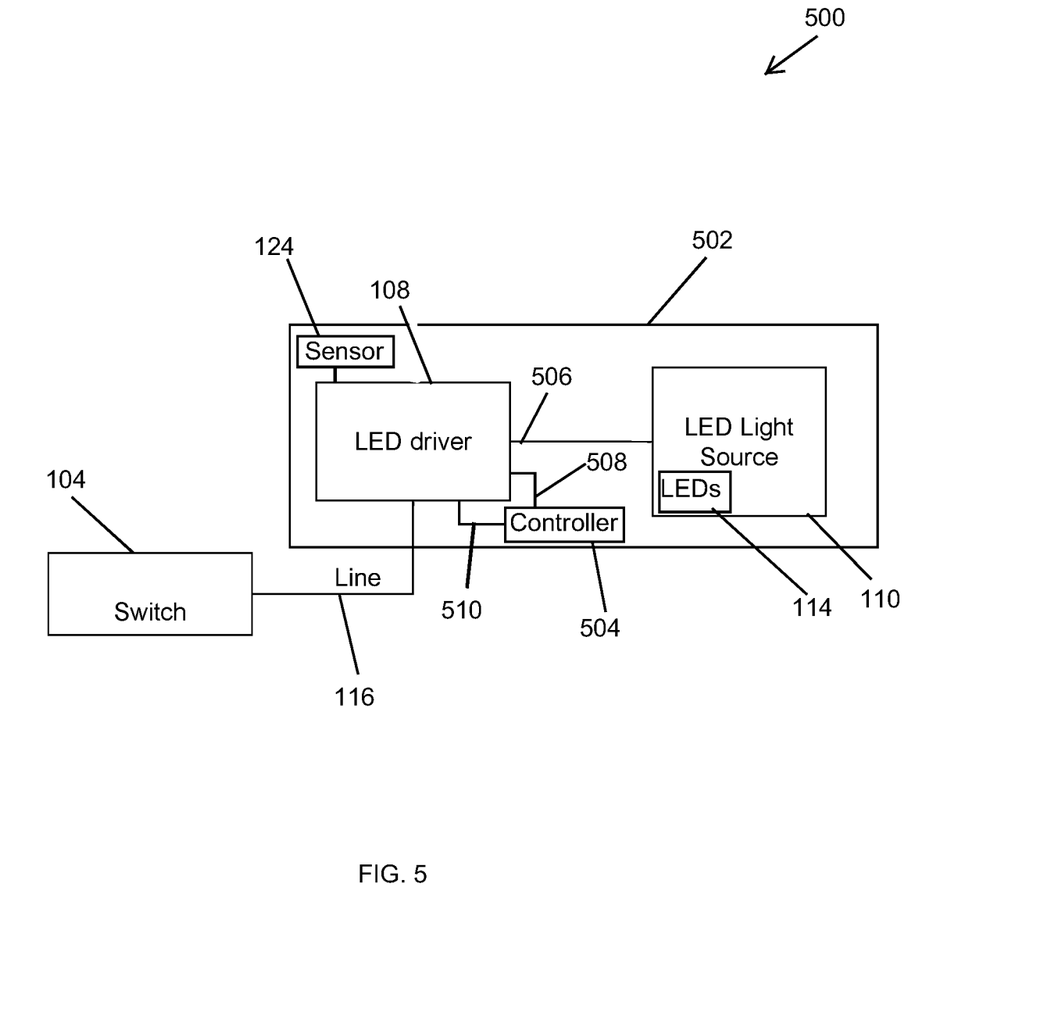
FIG. 5 illustrates a lighting system including a lighting device according to another example embodiment.

FIG. 5 illustrates a lighting system 500 including a lighting device 502 according to an example embodiment. The system 500 also includes the switch 104. The switch 104 may control the availability of AC power to the lighting device 502 as described above with respect to the lighting devices 102, 302.

In some example embodiments, the lighting device 502 includes the LED driver 108, a control device 504, and the light source 110. The LED driver 108 may receive the AC power when the switch 104 is in the on-position and generate a first driver power from the AC power that may be provided to the light source 110 on a connection 506. The light source 110 may emit a light when powered by the first driver power. The first driver power from the LED driver 108 is provided to the light source 110 based on whether the first driver power was provided to the light source 110 when the switch 104 was last in the on-position as described above with respect to the lighting devices 102, 302.

In some example embodiments, the LED driver 108 may also generate a second driver power from the AC power and provide the second driver power to the control device 504 via a connection 508. The control device 504 may detect when the second power becomes available and, upon detecting the second power becoming available, the control device 504 may indicate to the LED driver 108, via a connection 510, to provide the first driver power to the light source 110 based on whether the first driver power was provided to the light source 110 when the AC power was last available to the LED driver 108. Because the second driver power is generated from the AC power when the switch 104 is in the on-position, the availability of the second driver power corresponds with the switch 104 being in the on-position. The control device 504 may store information in a non-volatile memory (e.g., an EEPROM or Flash memory) indicating the detection of the second power becoming available and/or that the first power is provided to the light source 110 for subsequent use by the control device 504 in determining whether the first drive power should be generated by the LED driver 108 and/or provided to the light source 110.

Upon subsequently detecting the second power becoming available after becoming unavailable (e.g., a full toggle of the switch 104 to off and back to on), the control device 504 may indicate to the LED driver 108 to make the first driver power unavailable to the light source 110 although the AC power is available. Upon a further subsequent detection of the second power becoming available after becoming unavailable, the control device 504 may indicate to the LED driver 108 to make the first driver power available to the light source 110. The control device 504 may continue to control the LED driver 108 in such a manner upon detections of the second power becoming available by alternating between indicating to the LED driver 108 to provide and not to provide the first driver power to the light source 110.

In some example embodiments, the LED driver 108 may indicate to the control device 504 that the first driver power should be provided to the light source 110, for example, based on a wirelessly received lighting command, a programmed schedule, a sensor input, a timer input, etc. Upon receiving such an indication from the LED driver 108, the control device 504 may indicate to the LED driver 108 to make the first driver power available to the light source 110 via the connection 506. The LED driver 108 may then provide the first driver power to the light source 110. Alternatively, the lighting command and other inputs may be provided to the control device 504 instead of to the LED driver 108, and the control device 504 may indicate to the driver 108 to make the first driver power available to the light source 110.

By making power available to some components the lighting device 502 while the light source 110 is powered off, for example, using the switch 104, the controller 504 enables the lighting device 502 to operate in response to programmed schedules, user inputs, sensor and other inputs, etc. to power on the light source 110 to emit a light.

In some example embodiments, the control device 504 may perform the same operations described above with respect to the control devices 112, 306. In some example embodiments, the control device 504 may be integrated in the LED driver 108. In some example embodiments, the lighting device 502 may include other components instead of or in addition to the components shown in FIG. 5 without departing from the scope of this disclosure. For example, some of the components of the lighting device 502 may be integrated into a single component. In some alternative embodiments, the control device 504 may control whether the driver power from the driver 108 is provided to the light source 110 based on multiple full toggles of the switch 104 (e.g., two or more back to back toggles from the on-position to the off-position and back to the on-position) where the second power is becomes unavailable and then available multiple times.

Figure 6:
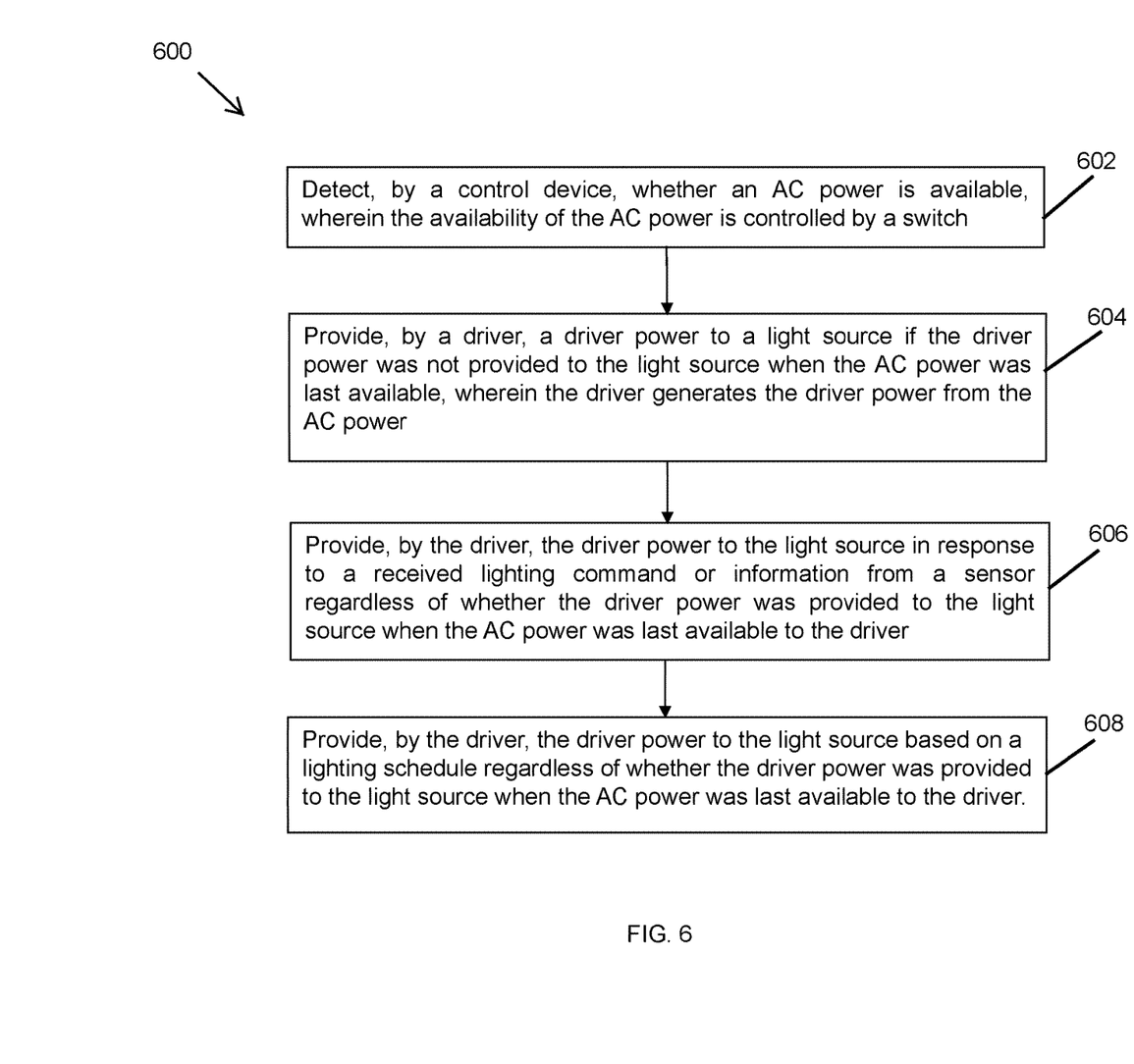
FIG. 6 illustrates a method of lighting control according to an example embodiment.

FIG. 6 illustrates a method of lighting control 600 according to an example embodiment. Referring to FIGS. 1-6, at step 602, the method 600 includes detecting, by the control device 112, 306, 504, whether an AC power is available, where the availability of the AC power is controlled by the power switch 104. At step 604, the method 600 includes providing, by the driver 108, 304, a driver power to the light source 110 if the driver power was not provided to the light source 110 when the AC power was last available to the lighting device 102, 302, 502 or to the driver 108, 304. The driver 108, 304 generates the driver power from the AC power.

In some example embodiments, the method 600 may also include, at step 606, providing, by the driver 108, 304, the driver power to the light source 110 in response to a received lighting command (e.g., via the transceiver 402) or information from the sensor 124 regardless of whether the driver power was provided to the light source 110 when the AC power was last available to the driver 108, 304. For example, when the AC power is available and the driver power is not being provided to the light source 110 because the driver power was provided to the light source 110 when the AC power was last available, the control device 112, 306, 504 may receive a lighting command or information from the sensor (or another device) and make the driver power available to the light source 110 in response to the lighting command or information.

In some example embodiments, the method 600 may also include, at step 608, providing, by the driver 108, 304, the driver power to the light source 110 based on a lighting schedule regardless of whether the driver power was provided to the light source 110 when the AC power was last available to the driver 108, 304.

In some example embodiments, the method 600 may include storing in a memory device (e.g., the memory device 414), by the control device 112, 306, 504, information indicating whether the driver power is provided to the light source when the AC power is available. The method 600 may also include retrieving, by the control device 112, 306, 504, the information from the memory device when the AC power becomes available after becoming unavailable subsequent to the storing of the information. The control device 112, 306, 504 uses the information to determine whether the driver power should be provided to the light source.

In some example embodiments, the method 600 may include other steps. In some example embodiments, the method 600 may include fewer steps than described above.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A method of lighting control, the method comprising:
    detecting, by a control device of a lighting fixture, whether an AC power is available to the lighting fixture, wherein an availability of the AC power to the lighting fixture is controlled by a switch that is external to the lighting fixture, wherein the AC power is available to the lighting fixture when the switch is in an on-position, and wherein the AC power is unavailable to the lighting fixture when the switch is in an off-position; and
    controlling, by the control device of the lighting fixture, whether a driver of the lighting fixture generates a driver power based on whether the driver power was provided to a light source of the lighting fixture when the AC power was last available to the lighting fixture.

2. The method of claim 1, wherein the control device is configured to control the driver such that the driver generates the driver power from the AC power if the driver power was not provided to the light source when the AC power was last available to the lighting fixture.

3. The method of claim 1, wherein the control device is configured to control the driver such that the driver does not generate the driver power from the AC power if the driver power was provided to the light source when the AC power was last available to the lighting fixture.

4. The method of claim 1, further comprising generating, by the driver, the driver power based on a lighting schedule regardless of whether the driver power was provided to the light source when the AC power was last available to the lighting fixture.

5. The method of claim 1, wherein the control device is external to the driver.

6. The method of claim 1, wherein the driver power is not generated by the driver when the switch is in the on-position if the driver power was provided to the light source when the switch was last in the on-position.

7. The method of claim 1, wherein the control device detects whether the AC power is available based on the driver power.

8. The method of claim 7, wherein the control device controls a switch device to control whether the driver power is provided to the light source.

9. The method of claim 1, further comprising storing in a memory device, by the control device, information indicating whether the driver power is provided to the light source when the AC power is available.

10. The method of claim 9, further comprising retrieving, by the control device, the information from the memory device when the AC power becomes available after becoming unavailable subsequent to the storing of the information, wherein the control device is configured to determine, based on information, whether the driver is to provide the driver power to the light source.

11. A lighting device, comprising:
    a light source;
    a driver configured to generate a driver power from an AC power provided to the driver, wherein the driver is configured to provide the driver power to the light source via an electrical connection and wherein an availability of the AC power to the driver is controlled by a switch; and
    a control device configured to control whether the driver generates the driver power at least based on whether the driver power was provided to the light source when the AC power was last available to the driver.

12. The lighting device of claim 11, wherein the control device is configured to control the driver such that the driver generates the driver power from the AC power if the driver power was not provided to the light source when the AC power was last available to the driver.

13. The lighting device of claim 11, wherein the control device is configured to control the driver such that the driver does not generate the driver power from the AC power if the driver power was provided to the light source when the AC power was last available to the driver.

14. The lighting device of claim 11, wherein the driver is configured to provide the driver power to the light source in response to a received lighting command or information received from a sensor regardless of whether the driver power was provided to the light source when the AC power was last available to the driver.

15. The lighting device of claim 11, wherein the driver is configured to provide the driver power to the light source based on a lighting schedule regardless of whether the driver power was provided to the light source when the AC power was last available to the driver.

16. A lighting system, comprising:
  a switch;
  a light source;
  a driver configured to generate a driver power from an AC power that is controlled by the switch, wherein the AC power is available to the driver when the switch is in an on-position and wherein the AC power is unavailable to the driver when the switch is in an off-position; and
  a control device that controls whether the driver generates the driver power at least based on whether the driver power was provided to the light source when the switch was last in the on-position such that the AC power was provided to the driver.

17. The lighting system of claim 16, wherein the control device is configured to control the driver such that the driver generates the driver power from the AC power if the driver power was not provided to the light source when the switch was last in the on-position such that the AC power was provided to the driver.

18. The lighting system of claim 16, wherein the control device is configured to control the driver such that the driver does not generate the driver power from the AC power if the driver power was provided to the light source when the switch was last in the on-position such that the AC power was provided to the driver.

19. The lighting system of claim 16, wherein the driver is configured to provide the driver power to the light source in response to a received lighting command or information received from a sensor regardless of whether the driver power was provided to the light source when the AC power was last available to the driver.

20. The lighting system of claim 16, wherein the light source, the driver, and the control device are integrated in a lighting fixture and wherein the switch is external to the lighting fixture.

* * * * *